March 2, 1954  H. L. SNAVELY  2,670,625
CONTINUOUS READING SPECIFIC GRAVITY INDICATOR
Filed Sept. 14, 1948
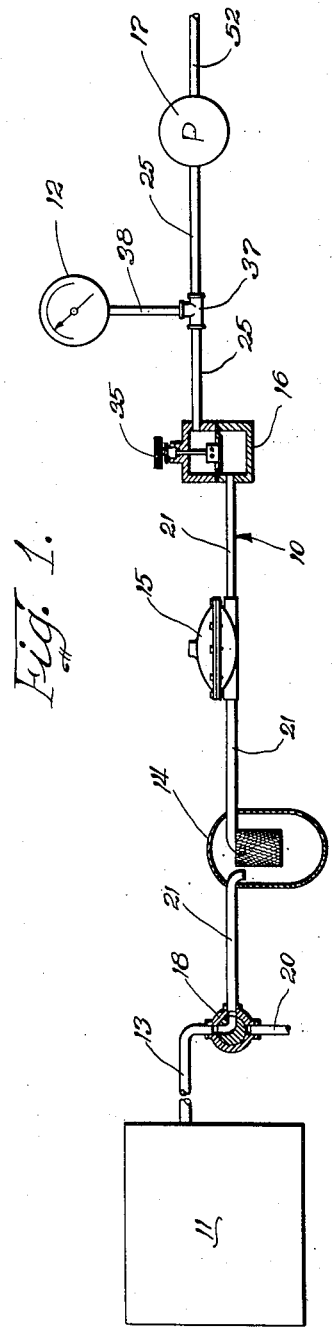
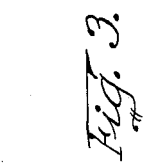
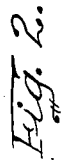
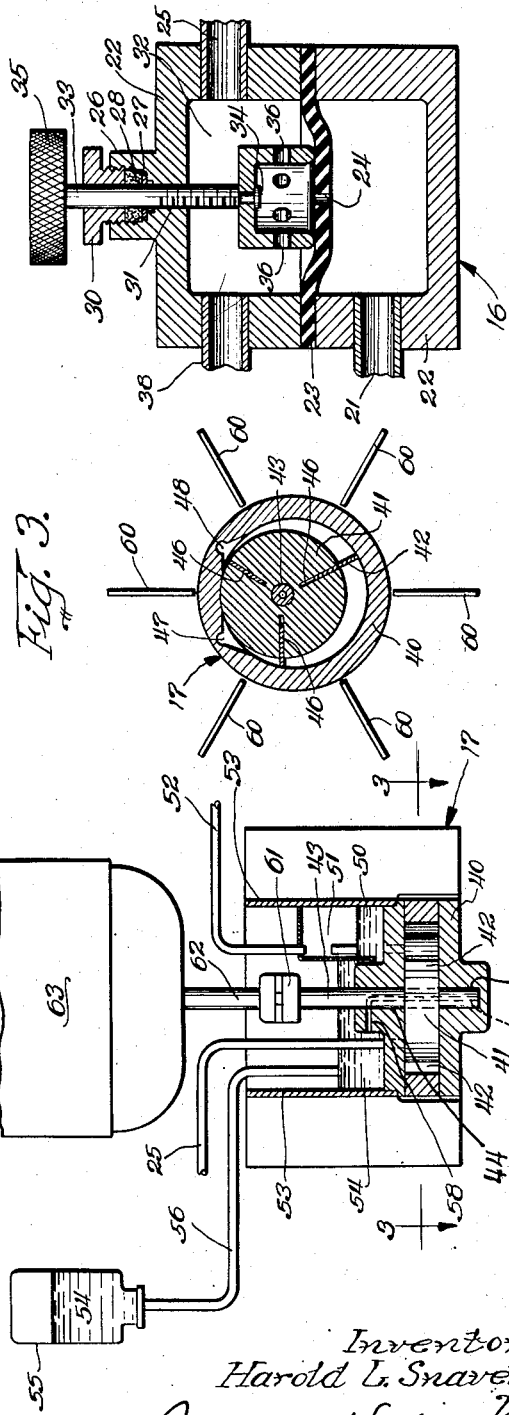
Inventor:
Harold L. Snavely.
By
atty Patented Mar. 2, 1954

2,670,625

UNITED STATES PATENT OFFICE 2,670,625

CONTINUOUS READING SPECIFIC GRAVITY INDICATOR

Harold L. Snavely, Oak Lawn, Ill., assignor to Atmotrol Corporation, Chicago, Ill., a corporation of Illinois Application September 14, 1948, Serial No. 49,221

8 Claims. (Cl. 73—30)

This invention relates generally to gas analyzers and more particularly to an improved apparatus for continuously indicating the specific gravity or composition of a gas mixture.

This application is a continuation in part of my application Serial No. 763,932 entitled Atmosphere Indicator and Controller filed July 26, 1947, now abandoned, reference and incorporation of which is hereby made.

In recent years a need for an indicator which will give an accurate continuous indication of the specific gravity or composition of gas mixtures has developed chiefly because of recent developments in the art of heat treating metals wherein controlled gas atmospheres are employed in heat treating furnaces.

One object of this invention, therefore, is to provide an apparatus for determining the composition of an atmosphere or mixture of gases as a continuous or instantaneous process.

Another object is to provide an apparatus which is particularly responsive to the amount of hydrogen or carbon dioxide in a furnace atmosphere and which is foolproof and may readily be calibrated or zeroed against a gas as plentiful as air or other known gases, if desired.

Another object is to provide an apparatus which continuously determines and indicates the specific gravity content of a gas atmosphere with only a small stream of gas from the atmosphere being withdrawn.

A further object is to provide an instrument which will determine the specific gravity of an unknown gas mixture by continuously withdrawing a small stream of said mixture and measuring the relative pressure drops of the unknown and a known gas passing through a single restriction to obtain a value which is a function of the specific gravity.

A further object is to provide an indicator in which a filtered gas stream is drawn through a restricting orifice, being supplied at a constant pressure, by a constant volume pump, the pressure downstream of the orifice being measured to give an indication of the specific gravity or composition of the gas.

A further object is to provide a novel flow restrictor element having an adjustable orifice which is self-cleaning and which may be readily adjusted to vary the size of the opening therethrough.

Another object is to provide an adjustable fluid flow restrictor having a flexible member provided with an opening therethrough, mechanical force being applied to said member to vary the size of the opening.

A further object is to provide a restrictor element in which a flexible diaphragm having an opening therethrough is stretched to enlarge the size of the opening and relaxed to reduce it.

A further object is to provide a novel vane type constant volume leak proof pump having a lubricating arrangement which improves its performance for use in the indicator and which induces a pulsating vacuum which produces vibration of the restrictor diaphragm, the vibration preventing the orifice from becoming clogged.

Other additional objects and advantages of this invention will, of course, present themselves to those familiar with the art upon reading the following specification in conjunction with the drawing and the appended claims.

In the drawings:

Fig. 1 is a schematic view showing various elements of the indicator of this invention and the manner in which they are connected.

Fig. 2 is a vertical section through the pump element.

Fig. 3 is a horizontal section taken on line 3—3 of Fig. 2.

Fig. 4 is an enlarged vertical section showing the preferred construction of the restrictor.

The fundamental idea of this invention is to withdraw a continuous stream of gas from a body, conduct the stream through an orifice, and measure the pressure drop of the stream over the orifice. This pressure drop has been found to be substantially a linear function of the specific gravity of the gas, which specific gravity, insofar as the usual furnace atmospheres are concerned, has been found to depend directly on the composition of the gas, providing measurements are made under substantially the same conditions of temperature and pressure.

Although the apparatus of this invention may be used for many different mixtures of gases, it functions particularly well for furnace atmospheres containing hydrogen or carbon dioxide because of the wide difference between the molecular weights, and hence specific gravities of these two substances and the other common constituents of furnace atmospheres.

The various elements of the indicator system 10 of this invention are shown schematically in Fig. 1 as connected to a body of gas to be analyzed indicated at 11. Actually, this body 11 may be a furnace, an atmosphere generator, a gas mixer, a conduit, etc.

In practice, it is preferred to mount the various elements in a metal box having an access door on one side provided with a window or opening through which the gauge 12 is visible. However, for the purpose of description, the various elements are shown to be spread out along a line. Actually, it makes little difference how the various elements are mounted or spaced from each other except that it is preferred to keep them close together in order to reduce the response time of the indicator.

The indicator system 10 comprises a sample withdrawal conduit 13, a filter 14, a pressure regulator 15, a flow restrictor 16, and a pump 17 in addition to the pressure gauge 12 mentioned above. The withdrawal conduit 13 extends from the gas body 11 to a throwover valve 18. The other inlet to this valve is open to the atmosphere through an air conduit 20. The outlet of the valve 18 is connected by a conduit 21 through the filter 14 and regulator 15 to the variable restrictor 16. Thus, a filtered sample of gas or air is supplied to the restrictor 16 at a constant pressure.

The regulator 15 is preferably of the negative pressure type and is set to deliver gas at a pressure slightly below atmospheric, preferably in the neighborhood of —5 inches of water. The purpose of this regulator is to eliminate the effects of changes in the furnace pressure of the gas body or the pressure drop through the filter 14 and to equalize any differential between air and gas pressure. When the body of gas 11 is under high pressure, it is preferred to provide an additional regulator (not shown) in the conduit 13 to lower the pressure to a value near atmospheric.

The variable restrictor 16 (Fig. 4) comprises a two piece hollow cylindrical body 22, a circular flexible elastomer diaphragm supported between the two halves of the body 22, and means for exerting varying mechanical pressure on one side of the diaphragm 23 to cause it to be deformed. A circular opening or orifice 24 for the passage of gas is provided in the center of the diaphragm 23. The lower half of the body 22 is provided with an opening in which the end of the conduit 21 is received and the upper half 22 is provided with an opening in which a conduit 25 is received. Another opening in the top of the body 22 (as shown in Fig. 4) is preferably provided for connection of the gauge 12.

The upper half of the body 22 has a boss 26 thereon which is drilled and threaded to receive a washer 27, packing 28, and a packing gland 30. At the bottom of the boss 26, a threaded opening 31 into the cavity 32 is provided. A threaded stem 33 is received in the opening 31 and extends into the cavity 32. It is preferred to provide left hand threads on the stem 33 and in the opening 31. This is done so that the gauge pointer will move in the same direction as the stem 33 when the stem 33 is rotated, conventional gauges moving in the clockwise direction.

The end of the stem 33 is rotatably connected to a cup shaped member 34, the stem 33 projecting through the member 34 and being peened over. The other end of the stem is provided with a knurled handwheel 35. Thus, by rotating the handwheel 35, the stem 33 is moved in or out carrying the member 34 with it.

The cup shaped member 34 is provided with a plurality of radial holes 36 which serve as gas passageways and the lower end is rounded so as not to injure the diaphragm 23. When the stem 33 is screwed into the body 22, more pressure is exerted on the diaphragm 23 causing it to stretch and enlarge the orifice 24. When the stem 33 is screwed out, the diaphragm 23 relaxes and the orifice 24 becomes smaller. It is preferred to pass the gas through the restrictor 16 from the bottom to the top as shown in Fig. 4, for any solid particles which pass through the orifice 24 and are deposited in the restrictor 16 tend to accumulate in the top of the hollow cup shaped member 34 and may be loosened by moving the member in and out. Actually, however, the restrictor 16 will function regardless of the direction of gas flow.

The pump 17 is preferably constructed so as to induce a pulsating vacuum, the pulsations occurring at a relatively high frequency. To accomplish this, it is preferred to use a vane type pump having three vanes rotating at a speed of approximately 1800 R. P. M. Thus, ninety pulsations per second occur.

The pulsating vacuum causes the diaphragm 23 to vibrate with each pulsation. This vibration prevents the orifice 24 from becoming clogged. It has been found that if the frequency of the pulsations is too low, the pointer of the gauge 12 also vibrates and readings are more difficult to obtain. On the other hand, if the frequency of pulsation is too high, the diaphragm 23 will not vibrate satisfactorily. In this connection it is also desirable to keep the length of the conduit 25 as short as possible to prevent the pulsations being damped to too low an amplitude.

In the event, however, that the orifice should become clogged due to a defect in the filter 14 or some other cause, all that need be done is to screw the stem 33 in and out a few times to flex the diaphragm 23 to clean it.

In some instances, variable restrictors having a block of flexible material provided with a gas passage therethrough have proved desirable. In such restrictors, the size of the passage is varied by compressing the block rather than by stretching it.

In Fig. 2, the conduit 25 is shown to extend through a T fitting 37 to the pump 17, the side branch of the T 37 being connected to the gauge 12 by a conduit 38. Actually, it is preferred to connect the gauge 12 directly to the restrictor 16 as shown in Fig. 4. This eliminates the use of the T fitting 37, the conduit 38 being connected directly to an opening in the top of the restrictor body 22.

The gauge 12 is a conventional vacuum gauge preferably having a range of approximately 0 to —60 inches of water if the indicator is to be used primarily to measure specific gravities less than unity. When specific gravities above unity are to be measured, a gauge which reads from —40 to —75 inches is preferred, or one whose hand moves quite slowly until a vacuum of 45 inches is reached and then which moves rapidly as the vacuum is increased to 75 inches.

The values cited above are illustrative only, for they will depend on the capacity of the pump with which the gauge 12 is used and the unstretched size of the orifice 24.

The gauge 12 may be calibrated in either specific gravity units or in units of composition, as set out more fully in my earlier filed application, depending on the use to which the indicator is to be put. In most instances, however, it has proved desirable to employ specific gravity units, for the conversion to composition is quite simple and can be done with a graph or table or by formula.

The pump 17, as shown in Figs. 2 and 3, is a rotary vane pump comprising a three piece casing 40, a rotary impeller 41, and a plurality of vanes 42 carried by the impeller 41. The pump shaft 43 is fixed to the impeller 41 and is journalled in bearings 44 and 45 which are eccentric with respect to the casing 40, the vanes 42 are slidably received in radial slots 46 milled into the impeller 41 and are thrown outwardly by centrifugal force to ride against the wall of the casing 40 when the impeller 41 is rotated.

Gas is drawn into the pump 17 through the conduit 25 which connects to the inlet port 47 and is carried by the rotating vanes 42 to the outlet port 48 which opens into a short conduit 50. The upper end of the conduit 50 projects into a bell 51 supported slightly above the top of the casing 40. An exhaust conduit 52 opens into the top of the bell 51 and provides an exit therefrom. The two conduits 50 and 52 are spaced apart, one being at each end of the bell 51 so that gas must circulate through the bell 51 before entering the conduit 52.

A cylindrical shell 53 is mounted on top of the casing 40, being preferably brazed or soldered thereto to form an oil tight joint, and forms a reservoir for lubricating oil 54. The oil 54 is supplied from an inverted storage bottle 55 mounted above the pump 17 by a conduit 56 which extends into the reservoir. Since the conduit 56 is the sole connection to the bottle 55, the oil level in the cylindrical reservoir is maintained even with the lower end of the conduit 56 and the effect is the same as if the pump 40 were submerged in oil.

To lubricate the bottom bearing 45, a vertical passage 57 is provided in the shaft 43. This passage is connected, once each revolution, to the body of oil 54 by a radial passage 58 through the casing 40 to the upper bearing 45. Thus, oil is allowed to seep into the pump 17 at both of the bearings 44 and 45 and serves to lubricate both the impeller 41 and the vanes 42, as well as the bearings 44 and 45.

The purpose of the bell 51 is to prevent oil being lost through the exhaust conduit 52. The stream emerging from the conduit 50 contains entrained oil drops, but these settle to the surface of the oil 54 and do not pass out of conduit 52.

A plurality of radial cooling fins 60 are attached to the outside shell 53 and serve to dissipate heat from the oil 54 and the pump casing 40. The pump shaft 43 is connected by a flexible coupling 61 to the shaft 62 of a driving motor 63. The motor 63 is a constant speed motor and is preferably synchronous, having a speed of 1800 R. P. M.

The indicator 10 operates as follows: The throwover valve 18 is first turned so as to be open to the air inlet conduit 20. The pump 17 is then placed in operation by energizing the motor 63. This causes air to be drawn through the filter 14 and the regulator 15 to the conduit 21 and through the restrictor 16.

The handwheel 35 on the variable restrictor 16 is then rotated until the gauge indicates a specific gravity of unity. The throwover valve 18 is then turned so as to withdraw gas from the body of gas, and after a few seconds, the unknown specific gravity of the gas may be read on the gauge 12.

It has been found that once it has been zeroed, as set forth above, the indicator 10 will remain accurate for long periods of time due largely to the self-cleaning feature of the variable restrictor 16. However, when precise readings are desired, it is a simple matter to turn the throwover valve 18 and rezero the instrument.

Various changes and modifications such as will present themselves to those familiar with the art may be made without departing from the spirit of this invention whose scope is defined by the following claims:

What is claimed is:

1. In combination a pump, a variable flow restrictor connected to the inlet of said pump and a pressure gauge connected between said pump and the restrictor, said restrictor comprising a flexible diaphragm, an orifice opening through said diaphragm, and means for exerting a varying mechanical force on said diaphragm to vary the size of said orifice including an element engaging the diaphragm around said opening to place the diaphragm surrounding said opening under tension, pulsations induced by said pump causing said diaphragm to vibrate preventing the accumulation of particles in said orifice.

2. In combination a vacuum pump, a variable flow restrictor connected to the inlet of said pump, and a pressure gauge connected between said pump and restrictor to measure the drop in pressure on the downstream side of the restrictor said restrictor having an elastic diaphragm and an orifice opening through said diaphragm, means engaging said diaphragm around said opening, and means displacing the first means to stretch said diaphragm around said opening and vary the size of said orifice, pulsations induced by said pump causing said stretched portions of the diaphragm around said opening to vibrate and keep said orifice clean.

3. In combination a rotary vane pump, a flow restrictor connected to said pump, and means intermediate the pump and restrictor for measuring the relative pressure present in said connection, said restrictor having a flexible diaphragm with a flat portion thereof under a stretch tension and an orifice opening through said flat portion, pulsations induced by said pump causing said diaphragm to vibrate, keeping said orifice clean.

4. The combination including a pump for producing a pulsating flow through a conduit, a restrictor and a pressure gauge connected to said conduit to measure the pressure drop across the restrictor, said restrictor comprising an elastic diaphragm supported under stretch tension and an orifice through said diaphragm, pulsations produced by said pump producing vibration of said diaphragm to prevent the accumulation of particles in said orifice.

5. In a continuous reading gas density meter the combination of a pressure differential gauge, a pulsating constant displacement pump for continuously sampling an atmosphere, a variable fluid flow restrictor device controlling the flow of gas through said pump and comprising a body having a cavity therein, a resilient relatively thin diaphragm mounted in said cavity in sealed relationship at its edges with the wall of said cavity to divide said cavity into two chambers, a conduit connected in communication with one chamber and a second conduit connected in communication with the other chamber, one of said conduits being connected to said pump and to said gauge with the gauge disposed between the pump and diaphragm and said diaphragm being subjected to the pulsations of said pump to keep it in constant agitation, said diaphragm having an opening therethrough at the point of approximately greatest agitation of the diaphragm, and means engaging said diaphragm around said opening and movable to displace said diaphragm laterally to place the portion thereof around said opening under tension to vary the effective size of said orifice.

6. In a continuous reading gas density meter the combination of a pressure differential gauge, a pulsating constant displacement pump for continuously sampling an atmosphere, a device controlling the flow of gas through said pump including a variable fluid flow restrictor comprising a body having a cavity therein, a flexible relatively thin diaphragm mounted in said cavity in sealed relationship at its edges with the wall of said cavity to divide said cavity into two chambers, a conduit connected in communication with one chamber and a second conduit connected in communication with the other chamber, one of said conduits being connected in connection with both said pump and gauge and said diaphragm being subjected to the pulsation of said pump to keep it in constant agitation, said diaphragm having an opening therethrough at the point of approximately greatest agitation of the diaphragm which is enlarged as said diaphragm is forced out of its normal plane to provide a variable orifice, and means engaging said diaphragm around said opening and movable to displace said diaphragm laterally to place the portion thereof around said opening under tension to vary the effective size of said orifice.

7. In a continuous reading gas density meter the combination of a pressure differential gauge, a pulsating constant displacement pump for continuously sampling an atmosphere, a variable fluid flow restrictor device controlling the flow of gas through said pump and comprising a body having a cavity therein, an elastic relatively thin diaphragm mounted in said cavity in sealed relationship at its edges with the wall of said cavity to divide said cavity into two chambers, a conduit connected in communication with one chamber and a second conduit connected in communication with the other chamber, one of said conduits being connected to said pump and gauge to subject said diaphragm to the pulsations of said pump to keep the diaphragm in continuous vibration and to subject the gauge to the pressure in said one of said conduits, said diaphragm having an opening therethrough at the point of approximately greatest vibration of the diaphragm, and means engaging said diaphragm around said opening and movable to displace said diaphragm laterally to place the portion thereof around said opening under tension during vibration to vary the effective size of said orifice and resist distortion of said orifice during vibration of the diaphragm.

8. In combination a vacuum pump, a pressure measuring device and a flow restrictor, said flow restrictor and said measuring device being connected to the inlet of said pump, said restrictor having a diaphragm with a flat portion thereof under tension and an orifice opening through said flat portion, pulsations induced by said pump causing said diaphragm to vibrate, keeping said orifice clean.

HAROLD L. SNAVELY.

References Cited in the file of this patent

UNITED STATES PATENTS

| Number | Name | Date |
|---|---|---|
| 997,124 | Garcia | July 4, 1911 |
| 1,354,681 | Okey | Oct. 5, 1920 |
| 1,633,352 | Tate | June 21, 1927 |
| 1,884,896 | Smith | Oct. 25, 1932 |
| 2,324,391 | Hersey | July 13, 1943 |
| 2,454,929 | Kempton | Nov. 30, 1948 |
| 2,464,917 | Babson | Mar. 22, 1949 |
| 2,500,750 | Halenza | Mar. 14, 1950 |